United States Patent

[11] 3,570,520

[72] Inventor Fiorello Sodi
　　　　　　　Via Palazzo dei Diavoli 22, Firenze, Italy
[21] Appl. No. 860,671
[22] Filed Sept. 24, 1969
[45] Patented Mar. 16, 1971
[32] Priority Jan. 15, 1969
[33] Italy
[31] 4420/69

[54] VOLUMETRIC VALVE
　　　14 Claims, 13 Drawing Figs.
[52] U.S. Cl. ............................................. 137/110,
　　　137/624.14, 137/599.1, 210/88
[51] Int. Cl. ....................................................... B01d 35/00,
　　　　　　　　　　　　　　　　　　　　　F16r 31/36
[50] Field of Search ........................................... 137/624.14,
　　　625.29, 599.1, 110; 210/88, 89

[56] References Cited
UNITED STATES PATENTS
2,310,978　2/1943　McGill .......................... 137/624.14X
3,509,998　5/1970　Pellett .......................... 137/624.14X Primary Examiner—Alan Cohan
Attorney—Waters, Roditi, Schwartz & Nissen ABSTRACT: A volumetric valve contains an impeller for undergoing rotation in opposite direction depending on the direction of passage of water through a resin in a vessel. The valve switches the direction of water flow after the impeller measures a given magnitude of water passage during treatment and regeneration respectively.

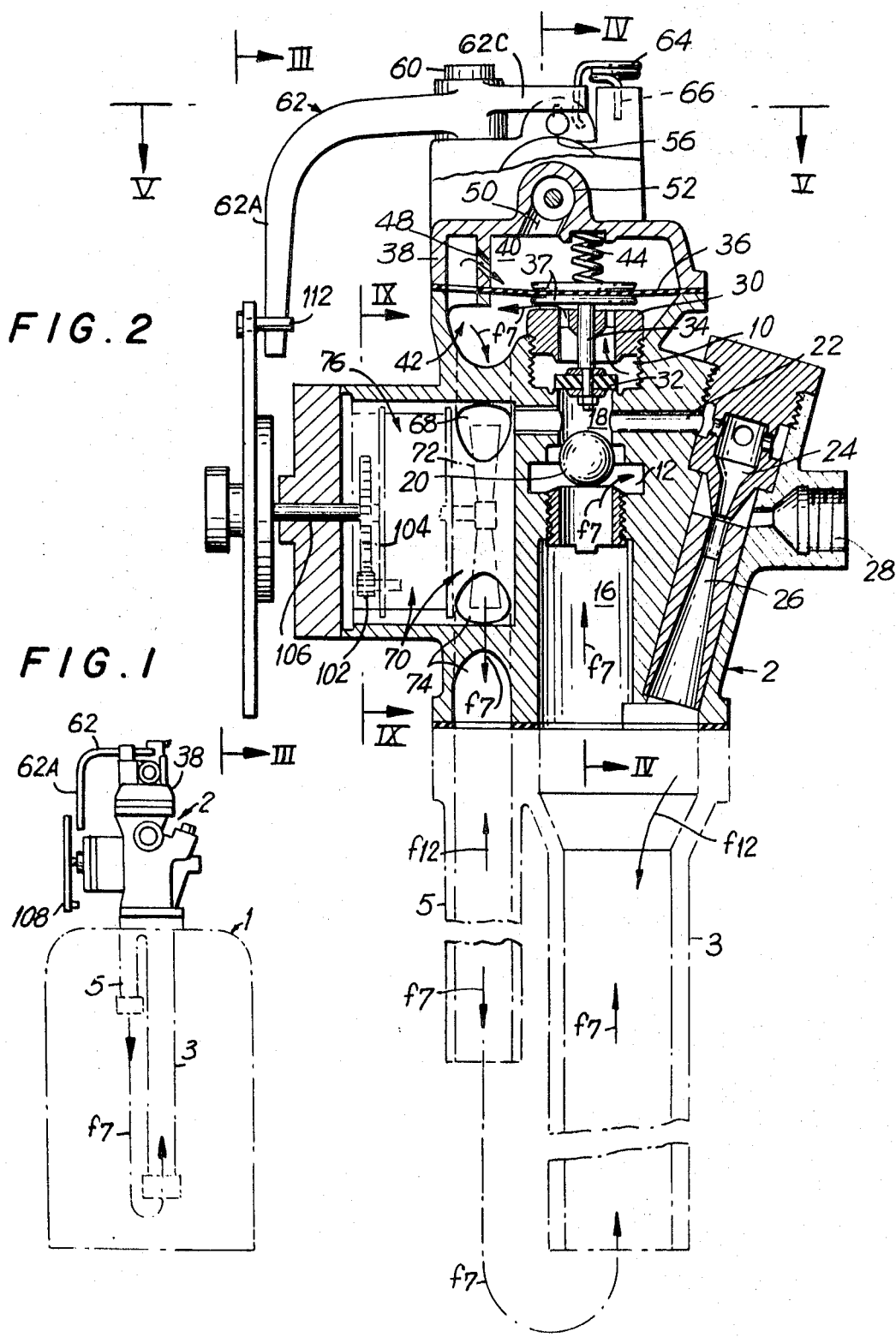

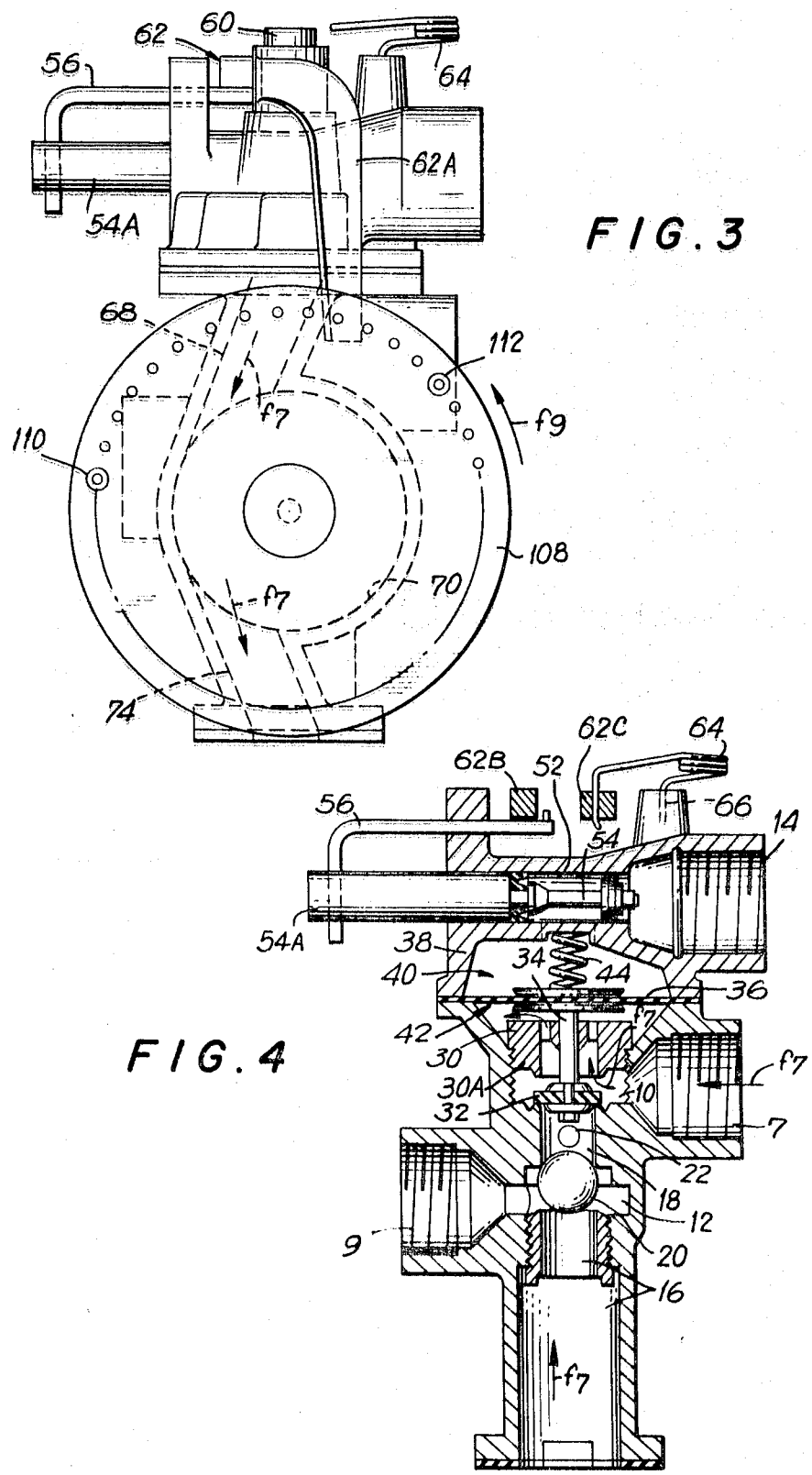

FIG. 5
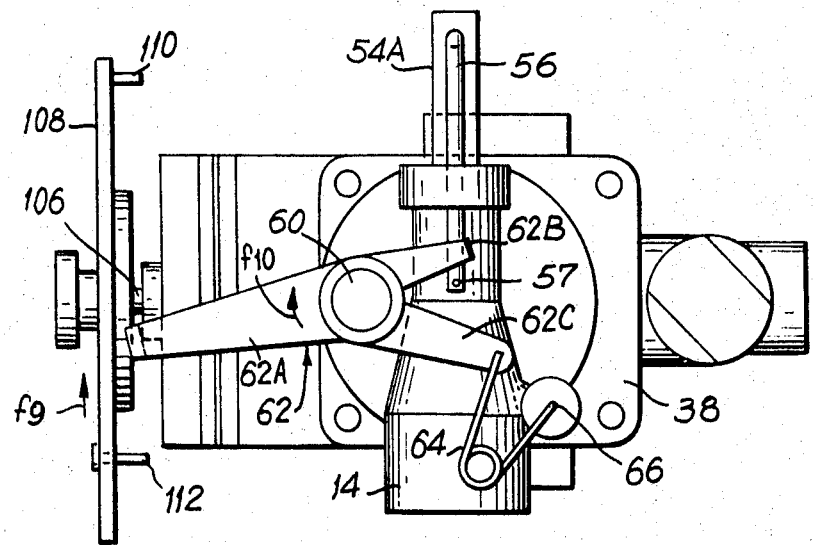
FIG. 6
FIG. 7
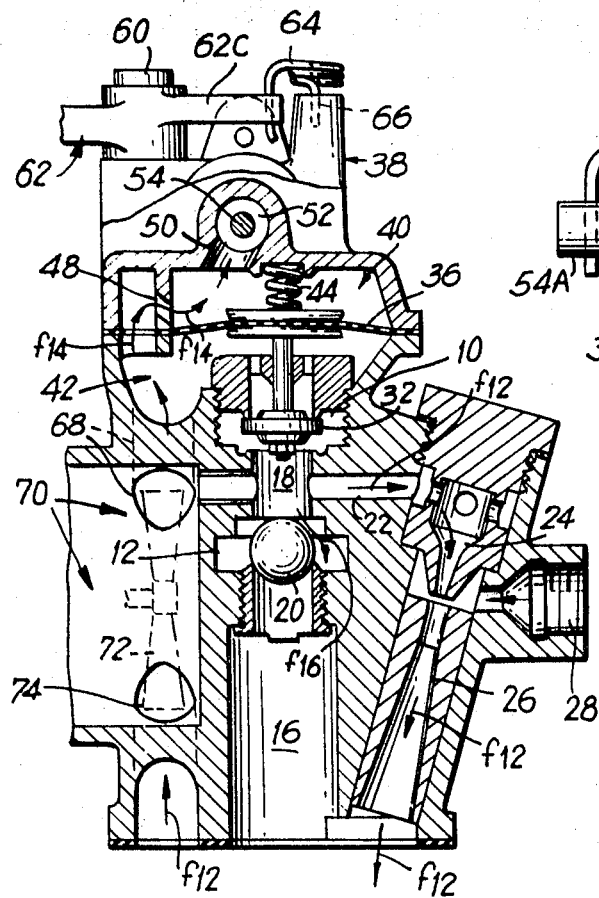

Patented March 16, 1971

VOLUMETRIC VALVE

BRIEF SUMMARY OF THE INVENTION

The invention relates to an automatic volumetric valve which controls the working cycles and regeneration of small water softeners containing exchange base resins which can be regenerated with brine or similar substance.

The water softening device comprises a receptacle containing ion exchange resins, and communicating either at its lower or upper regions with pipes equipped with a filter which are to be connected to the valve, and a tank containing brine, the latter also being connected to the valve by means of a tube. Also connected to the valve are an inlet pipe for the raw water, an output pipe for softened water, and a drainage pipe for rinse water.

The valve contains means for reversing the flow of the water from the bottom to the top or vice versa, means such as an ejector for sucking in brine, means to measure the amount of water passing through the water softening device in either direction, and means to control automatically the reversal of the flow according to passage of a predetermined volume of water in either passage.

According to the invention, the valve includes a volumetric measuring unit with an impeller, which rotates in one direction when the water is forced to flow through the water-softening apparatus from the bottom to the top and in the opposite direction when the water travels from the top to the bottom.

The volumetric measuring device controls a gear reduction means which in turn controls an outside mechanism which may be in the form of a disc, on which two pins are mounted such that at least of the pins can be adjusted in position along the periphery of the disc. These pins control the mechanism for the reversing of the flow of water. In essence, when the flow of water is reversed, the rotation of the disc is also reversed, and this in turn, after having revolved over the entire arc between one pin and the other, again reverses the flow of the water.

For proper operation and for an economy of the water and hence of the salt, in the transmission of the volumetric measuring device a mechanism is provided on the outer disc which ensures a variation in the ratio of the final transmission between the measuring device and the disc, so that if the measuring impeller rotates in one direction, there will be a transmission ratio which is quite different than that when the impeller rotates in the opposite direction.

In practice, said transmission consists of two unidirectional friction couplings, one of which is operative with the rotation in one direction of the impeller, and consequently with the transmission members and the outer disc, while the other coupling is operative with the rotation in the opposite direction of the impeller.

One of the embodiments of these unidirectional friction couplings comprises spiral springs entrained by the drive unit which may be a gear of the transmission and adapted to grip the driven member, which may be a shaft on which these springs are wound.

The pins on the disc, actuated in both directions of the impeller, are preferably adjustable in position, to correlate with the hardness of the water and hence to the frequency and duration of the regeneration cycles which are initiated after the delivery of a certain amount of softened water, depending precisely on the positioning of said pins.

One means of adjustment of the pins contemplates the formation of a plurality of holes disposed circumferentially on the disc in which the pins can be selectively placed.

The pins act on a drive designed to cause the reversal of the flow of the water in the softening device from top to bottom and from bottom to top, or conversely, so that the softening phase alternates with the resin regeneration phase and inversely, automatically.

Thus starting from a fixed pin on the disc, the valve will cause the water to travel from the top to the bottom of the softening device until the adjustable pin has acted on the reversing mechanism; after which, by reversing the flow of water, the disc will rotate in the opposite direction at a much higher rate with respect to the volume of water passing through, so that the fixed pin again reverses the flow and the procedure is repeated.

The mechanism for reversing the flow may comprise a multiway flow valve which is eventually controlled by a servomechanism which can produce the same water pressure in order to reduce the force which must be exerted by the pins on the disc in order to reduce the flow.

The invention includes, in addition, a device located normally in the brine container, which has the function of limiting the maximum level and the minimum level of the brine itself.

The aforementioned device is connected to the suction intake of a venturimeter incorporated in the volumetric valve so that when the water circulates in the proper direction the the venturimeter, the intake and dilution of the the proper is obtained by means of the propelling water. When the brine reaches the minimum level in the brine container, an element which can have the form of a small floating ball prevents air from being sucked in by the venturimeter, in which therefore only the propelling water will circulate which effects rinsing of the resins. Upon reversal of the flow, the water tends to circulate in the venturimeter in the opposite direction, and the water flows back through the brine inlet pipe to fill the brine container to a maximum level, which is determined by a suitable device such as a float.

The pins can act on a servomechanism for opening or closing the only drainage hole, thereby causing a disequilibrium in the pressure on a membrane or a drive piston, which in turn causes the reversal of the flow through a two-position plug.

In order to reduce the force required by the disc to cause the reversal of the flow, a followup link linkage is provided, even if merely to cause the opening of the drain.

The pins should be able to act on the flow-reversing members (or on the followup linkage) by means of a bistable mechanism, which causes the reversal rapidly and independently, i.e. under its own power.

This mechanism can consist of an electromagnetic system in which the pins on the disc have the sole function of actuating electrical contacts, while the electromagnetic force causes the reversal via a servomechanism. In another embodiment, a mechanism can be employed with an elastic accumulator, causing the direct compression of a spring by the pins, said spring, expanding rapidly and causing the displacement of the valve by a "snap action" to reverse the flow.

BRIEF DESCRIPTION OF THE DRAWING

FIG. 1 is a side view of a water softening device, including a resin container in dash-dot outline;

FIG. 2 is a vertical cross section through the volumetric valve of the softening device;

FIG. 3 is a view as seen along line III-III in FIG. 2;

FIG. 4 is a sectional view taken on line IV-IV in FIG. 2;

FIG. 5 is a view as seen along line V-V in FIG. 2;

FIGS. 6, 7 and 8 are cross-sectional views similar to those in FIGS. 2, 4 and 5, but in another of the two positions which the mechanism can assume;

DETAILED DESCRIPTION

Figure 8:
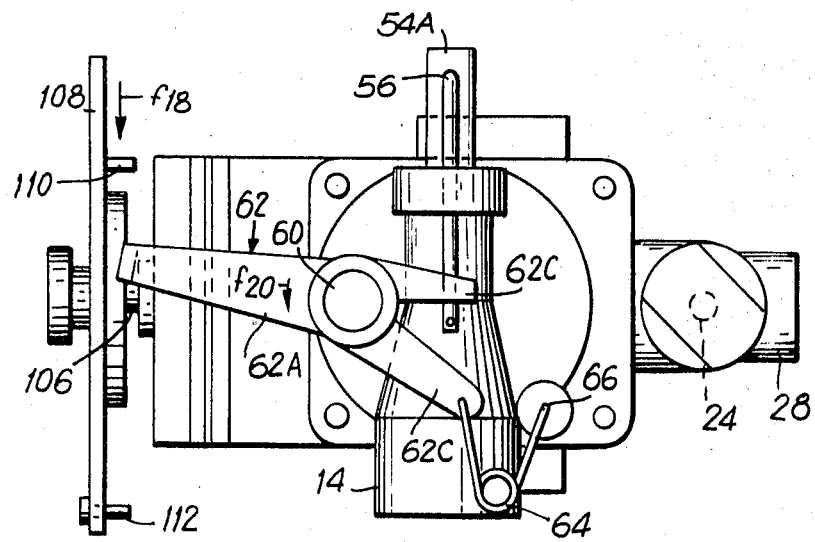
Figure 9:
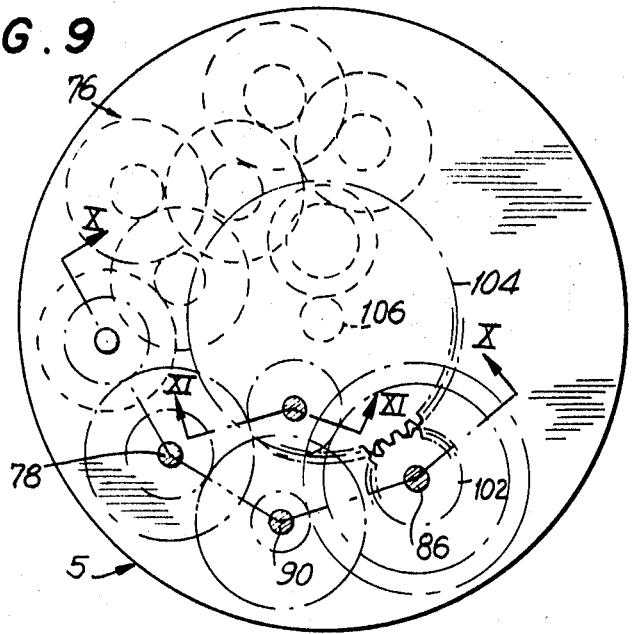
FIG. 9 is a sectional view taken along line IX-IX in FIG. 2.
Figure 11:
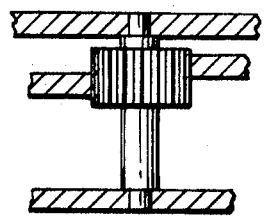
FIGS. 10 and 11 are sectional views taken along lines X-X and XI-XI respectively in FIG. 2.
Figure 10:
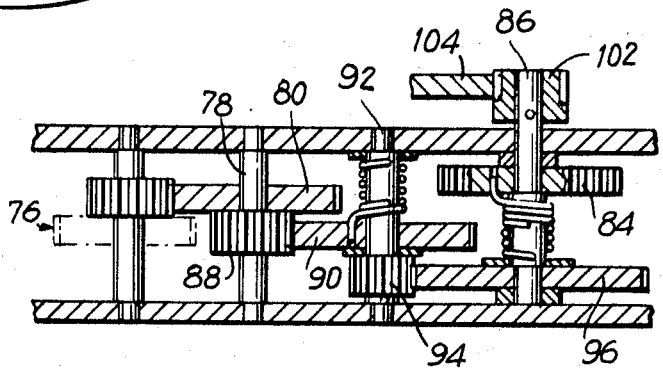
Figure 12:
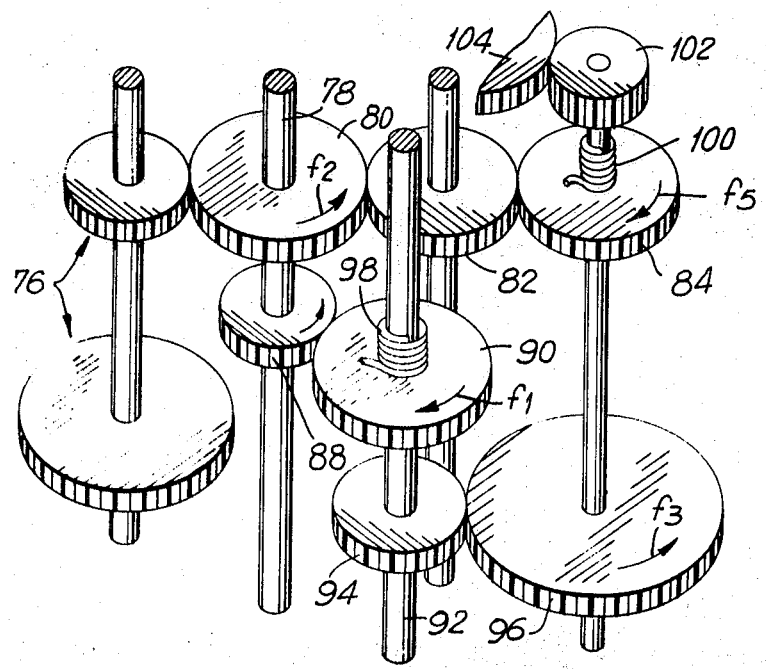
FIG. 12 shows a view in perspective of the members shown in FIGS. 9 and 11.

In the drawing (FIG. 1), 1 indicates a container for ionic exchange resins, on which is mounted a volumetric valve device 2.

The valve device 2 is operative, as will be explained more fully hereinafter, to pass raw inlet water through the container 1 to produce treated softened water which is discharged for utilization, and after a given amount of water has been so treated, the valve then causes reversal of direction of flow of water through the container, and introduces a given amount of brine, or other regenerating substance, into the water whereby effecting regeneration of the resin whereafter the valve reverses operation and commences again the water softening operation.

The device 2 is in communication either with the upper or lower parts of the resin container by means of two pipes 3 and 5, while the device 2 is connected to a raw water inlet pipe by means of a connection 7, and to an outlet pipe for purified, treated water by means of a connection 9. A connection 14 is attached to the pipe for water discharge drain during a regeneration phase, while a connection 28 is joined to a brine container.

In FIG. 2, a piston 32 of a hydraulic valve has a stem 34 which is axially guided in a seat 30. A diaphragm 36 is held between two washers 37 and the diaphragm is externally and circumferentially engaged between the head and the body of the volumetric valve, where the diaphragm also serves as a sealing gasket. A spring 44 acts on the piston 32 to urge the same to a given position.

A ball 20 faces piston 32 and as shown in FIG. 2, when resting on its own seat, serves to prevent the passage of water from the inlet pipe to pipe 3 and hence from the bottom to the top in the container while permitting flow of water from top to bottom as will be explained in greater detail later.

Reference numeral 24 indicates a nozzle of a venturimeter for the intake of brine, and numeral 26 shows an ejector from the same venturimeter.

At 72 is shown the impeller of a volumetric water meter, and 70 refers generally to a spaced reducer with a change gear incorporated with friction clutches. A disc 108 is coupled to the speed reducer by means of the shaft 106, and actuator elements 110, 122 are disposed on disc 108 such that at least one of the elements 110, 112 is adjustable in position along the circumference of the disc.

A lever 62 is pivotably mounted on a pin 60 and is held in one of two extreme positions by a spring 64. Reference numeral 52 indicates a kinematic connection or linkage between the lever 62 and a slide or flow valve 54. The lever 62 acts on the slide 54 with a certain delay due to the play which the latter has with respect to the kinematic connection.

In particular, the actuator elements 110, 112 act on an arm 62A of lever 62. Depending on the direction of rotation of disc 108, the arm 62A is turned accordingly. Two forks 62B and 62C extend from arm 62A and these forks are positioned to act on a lug 57 on arm 56 so as to displace the arm 56 in a direction related to the direction of rotation of disc 108 and cause displacement of slide 54 which is connected with arm 56. As a consequence, flow valve 54 will be moved accordingly. The construction is such that arm 56 is "snapped" from one position (FIG. 4) to another (FIG. 7) by the energy of a spring 64 as will be explained hereafter.

The spring 64 is attached to arm 62C so that as arm 62C is rotated by the engagement of actuator element 110, or 112 with arm 62A the spring 64 will pass through a "dead point" whereupon the spring will cause the arm 62C to rapidly assume one of its end positions. The arrangement of the spring and arm 62C is such that the arm 56 is snapped in a respective direction depending on the direction of rotation of disc 108 and arm 62A.

Thus, in operation, one of the actuator elements 110, or 112 contacts arm 62A and causes angular movement thereof to a point past the "dead point" of spring 64 whereupon the latter forcibly snaps lever 62, in the same direction, to one end position thereof causing the flow valve 54 to move to a corresponding position. When the angular movement is reversed, the flow valve will also be snapped in the reverse direction.

Figure 13:
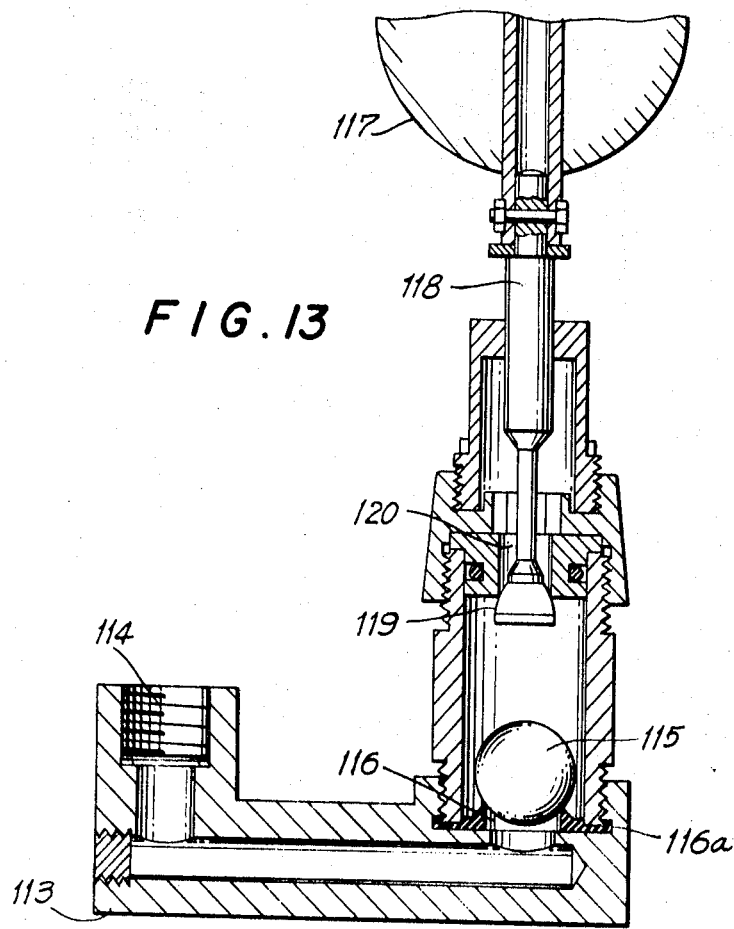
FIG. 13 is a sectional view of a brine control valve.

Another mechanism operated by the volumetric valve is a second valve, or brine valve (FIG. 13), which serves to regulate the maximum and minimum levels of the brine and is normally located in a brine tank (not shown). The brine valve comprises a body 113, the union 114 of which is connected by means of a pipe to the union 28 of the valve 2. A floating ball 115 can prevent the flow of the brine from the top to the bottom, by obstructing the hole 116 formed in a gasket 116a. A float system 117, adjustable on a rod 118 which carries a small piston 119, prevents the water coming from the union 28 from exceeding a given level, by closing the hole 120.

The speed reducer of the volumetric valve 2 serves as an intermediate kinematic mechanism between the impeller 74 of the volumetric counter and the disc 108, and possesses the feature of providing a different transmission ratio, depending on the direction of rotation of the impeller. One of the systems used in order to be able to obtain this particular operation is that described diagrammatically in FIGS. 9, 10, 11 and 12.

The impeller 72 transmits rotation through a reducer 76, reducing the number of revolutions, to a shaft 78, which through the wheel 88 transmits the motion to the wheel 90, turning loosely on its own shaft 92 and connected to the latter only by unidirectional friction provided by a spring 98 wound on the shaft 92. When the wheel 88 revolves in the direction of arrow $f2$, it drives the wheel 90 in the direction of the arrow $f1$. The unidirectional friction provided by the spring 98, which is tightly coiled around the shaft 92, will tend to tighten the latter, causing rotation of the shaft 92, while the other unidirectional friction formed by the spring 100 will tend to reduce, by sliding on the shaft 86, since the wheel 84 will rotate in a direction opposite arrow $f5$. In this case, the kinematic chain which transmits the motion will be formed by the wheels 88—90 and 94—96. When the wheels 80 and 88 revolve in a direction opposite the arrow $f2$, for the same reasons as those explained above, the spring 98 will slide on the shaft 92, while the spring 100 will cause rotation of the shaft 86. In this case, the kinematic chain which transmits the motion will be formed by the wheels 80, 82, 84. Since the transmission ratios between the two kinematic chains are different, the final transmission ratio between the impeller and the disc will be different depending on the direction of rotation of the impeller.

During the water softening phase, raw or hard water arrives under pressure from the connection 7, from whence, by passing through the seat 30, it reaches the chamber 42 and enters the volumetric container tangentially through pipe 68, causing the impeller 72 (which measures its quantity) to rotate, after which the water continues through the pipe 74, which is also tangential, to empty, eventually through a filter, into the top of the resin container. The water continues downward, passing through a bed of resin in the container 1, where ionic exchange takes place. Having reached the pipe 3 in the bottom of the container, through a filter (not shown), the water will rise through pipe 3 until it returns to the valve 2, and after having raised the ball 20 will leave through the connection 9 for ultimate use.

During its passage, the water will cause the impeller of the volumetric counter to turn proportionally, with the latter transmitting, by means of the speed reducer, the motion to the disc 108. After a certain volume of water has passed through the resin, the latter will be exhausted and it will be necessary to regenerate it. In fact, it is at this moment that the adjustable actuation element 110 or 112 on the disc 108 thrusts against the the lever 62 so that, upon overcoming the dead point of spring 64, the lever 62 releases the slide 54 of the drain.

The opening of the drain causes a pressure drop in the chamber 40, since the discharge opening is now larger than the hole 48 for the water intake; the pressure difference between the lower and upper sections of the diaphragm 36 creates a force which overcomes the opposition of the spring 44 and causes the piston 32 to rise from the lower seat thereof to the upper seat. At this moment, the circuit followed by the water is as follows: the entry of the raw water from the connection 7 and through the pipe 18 can, as shown in FIG. 7 in part leave the union 9 while closing the ball 20 on the seat. Concurrently as shown in FIG. 6 part of the water passes through the nozzle 24 and the ejector 26 after being added to brine passing the small valve 115 of FIG. 13 and entering through the connection 28; this mixture arrives at the pipe 3 which carries it to the lower part of the softening device where it comes into contact with the resin, regenerating same, and then the mixture reenters the valve 2, via the pipe 5, to enter the volumetric counter tangentially from the pipe 74, causing the impeller 72 to rotate in a direction opposite to that of the former direction, whereafter the mixture proceeds through the pipe 68 and the chamber 40 to exit via the connection 14. The brine passes from the brine tank, which normally is lower than the valve 2, and the valve in the brine tank operates by the suction effect which is created in the ejector 26. The ejector will continue to suck in the brine, until the level of the brine does not descend below the level of the floating ball 115 of FIG. 13. When this happens the ball 115 will close the passageway in the seat 116, so that the ejector does not take in air.

From this moment forward, brine is no longer delivered to the ejector, but the water coming from the nozzle 24 will continue to pass through the bed of resin, rinsing it of the residues of brine remaining therein. At the end of the cycle, the disc 108 will be returned to its original position and will cause the lever 62 to be released, thereby returning it to the operating position for the softening of the water. At the beginning of the softening phase, the ejector will cease to function, but the water coming from the pipe 3 will enter the ejector from the bottom thereof, moving toward the top and, leaving by way of the connection 28, it will arrive at the connection 114 of the brine valve (FIG. 13) and, upon entering the valve, will raise the ball 115 in order to exit through the hole 120. When the brine tank is at the proper level, the float 117 will close the valve 119, which will prevent the water from flowing out of the tank 1. During the operating or softening phase, the salt will have time to dissolve in the water in the brine tank to form the brine required for the next regeneration.

For the regeneration phase, the total volume of brine and water measured by the impeller should be much less than the volume of softened water; it is for this reason that, during this phase, the transmission ration between the impeller and the disc with the gripping elements be less, and the amount of water is only that which is strictly necessary to regenerate the resin.

With the system according to the invention, it is possible to vary the amount of softened water for each cycle, depending on the hardness of the water and the amount of resin in the container by displacing the actuation elements 110, 112 on the disc, while the amount of water required for the regeneration is always proportional to the amount of softened water, and more specifically proportional to the transmission ratios, which are determined by the directions of rotation of the impeller.

With the valve according to the invention, a rapid intake of the brine is obtained, as well as a regeneration and rinsing in a single phase, contrary to the separate phases which are contemplated in the presently known embodiments.

I claim:

1. An automatic volumetric valve adapted for controlling the softening of water by passage thereof through a resin bed and for controlling regeneration of the resin bed, said valve comprising: a volumetric counter including an impeller which can be driven in opposite directions of rotating, means defining a first path for the flow of water in one direction through the impeller during a softening operation, means defining a second path for the flow of water in an opposite direction through the impeller during a regeneration operation, reversing means for controlling the admission of water to one of said first and second paths, and means coupled to said impeller and said reversing means for controlling the admission of water to said respective paths based on the magnitude of rotation of the impeller.

2. A valve as claimed in claim 1, wherein said reversing means comprises a flow valve for selecting said paths, said means for controlling the admission of water to said respective paths comprising a rotatable disc coupled to the impeller for undergoing rotation therewith, and means coupling said disc with said flow valve to cause the latter to select said paths in accordance with the rotation of said disc.

3. A valve as claimed in claim 2, wherein said means coupling said disc with said flow valve comprises two pins on said disc with an angular interval therebetween, at least one of said pins being adjustable in position on the disc to vary said angular interval, and linkage means positioned in the path of travel of said pins to operate the flow valve when contacted by said pins.

4. A valve as claimed in claim 3 comprising transmission means between the impeller and disc to provide a different transmission ration for both said directions of rotation of the impeller.

5. A valve as claimed in claim 4, wherein said transmission means comprises two unidirectional friction couplings, one of which is operative in one direction of rotation of the disc and the other of which is operative in the other direction of rotation of the disc.

6. A valve as claimed in claim 5, wherein said transmission means comprises an input shaft coupled to said impeller, a pair of output shafts, and gear means between said input and output shafts, said unidirectional friction couplings comprising spiral springs clamped on said shafts and engaged with said gear means.

7. A valve as claimed in claim 3, wherein said disc is provided with a plurality of apertures in circumferential array, said pins being adjustable by selective engagement in respective apertures.

8. A valve as claimed in claim 2, wherein said valve comprises a body having a raw water inlet, a treated water outlet, a drain outlet during regeneration and an inlet for regenerating liquid, a valve member at said raw water inlet having a first position in which said first path is closed and a second position in which said first path is opened, and means biassing said valve member to said first position and including a chamber coupled to said drain, said flow valve closing said drain during a softening operation whereby the chamber is pressurized and the valve member biassed to said first position, said flow valve opening said drain during the regeneration operation.

9. A valve as claimed in claim 3, wherein said linkage means comprises spring means for rendering the linkage means bistable so that when the flow valve is actuated, it is snapped between operative positions for selecting one of said paths.

10. A valve as claimed in claim 9, wherein said spring means is positioned to be energized as the pin acts on the linkage means during rotation of the disc until the spring means snaps the linkage means from one position to the other to cause the flow valve to move to the other position thereof.

11. A valve as claimed in claim 1 comprising means in said second path to supply regenerant to the water flowing in the second path towards the resin.

12. A valve as claimed in claim 11, wherein said means in said second path comprises a venturi passage and regenerant supply means coupled to said venturi passage in the suction region thereof for the supply of regenerant by the suction produced in said venturi passage.

13. A valve as claimed in claim 12, wherein said regenerant supply means comprises valve means for defining minimum and maximum levels of regenerant in the regenerant supply means.

14. A valve as claimed in claim 13, wherein said valve means in the regenerant supply means comprises a float valve for limiting the maximum level in the regenerant supply means and a second float valve for closing communication between the regenerant supply means and said venturi passage when the minimum level of regenerant is reached in the regenerant supply means.